Sept. 20, 1927.
J. F. RULE
1,642,828
GLASS FORMING MACHINE
Filed April 19, 1923     3 Sheets-Sheet 1
FIG-1-
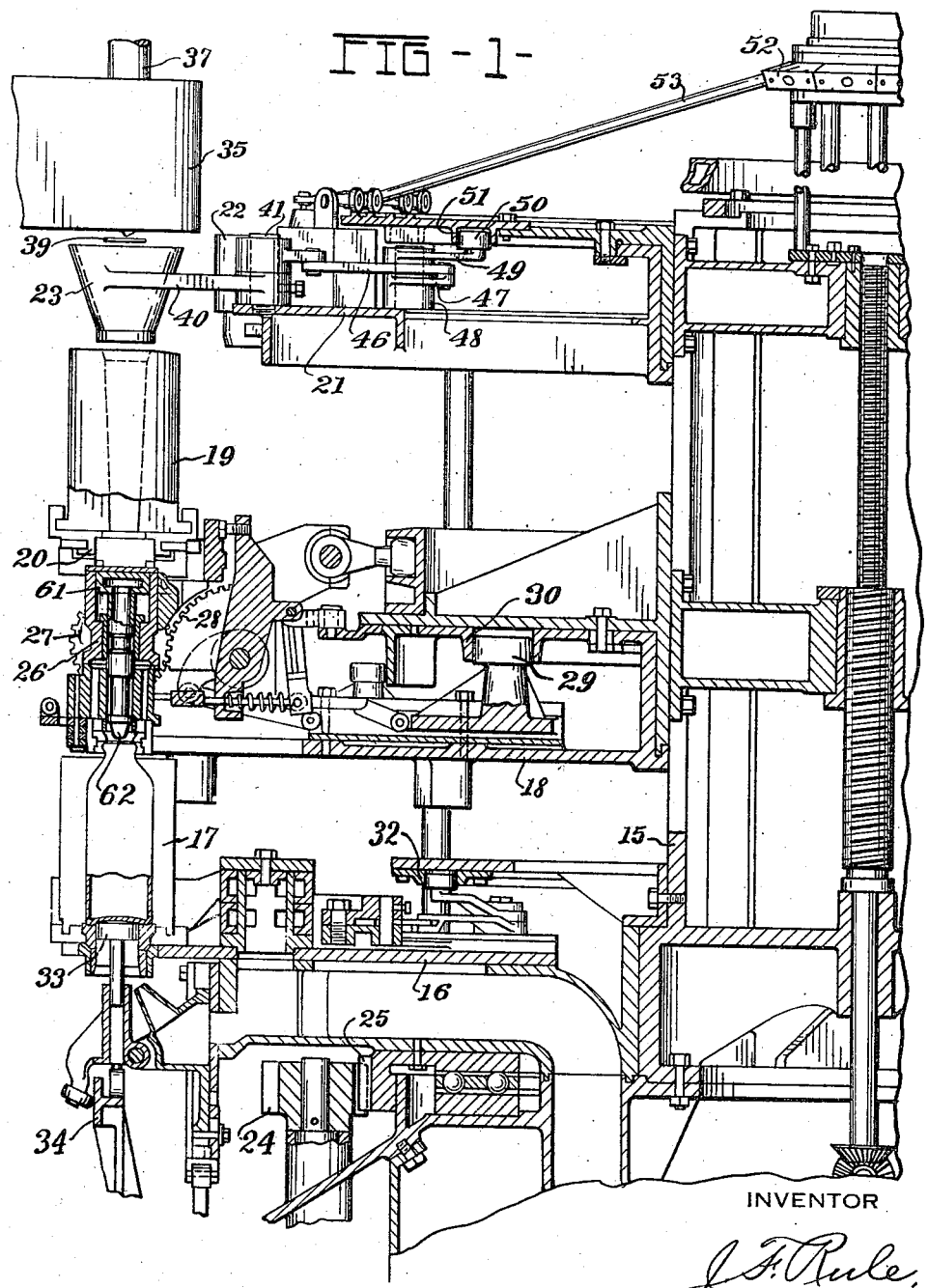
INVENTOR
J. F. Rule,

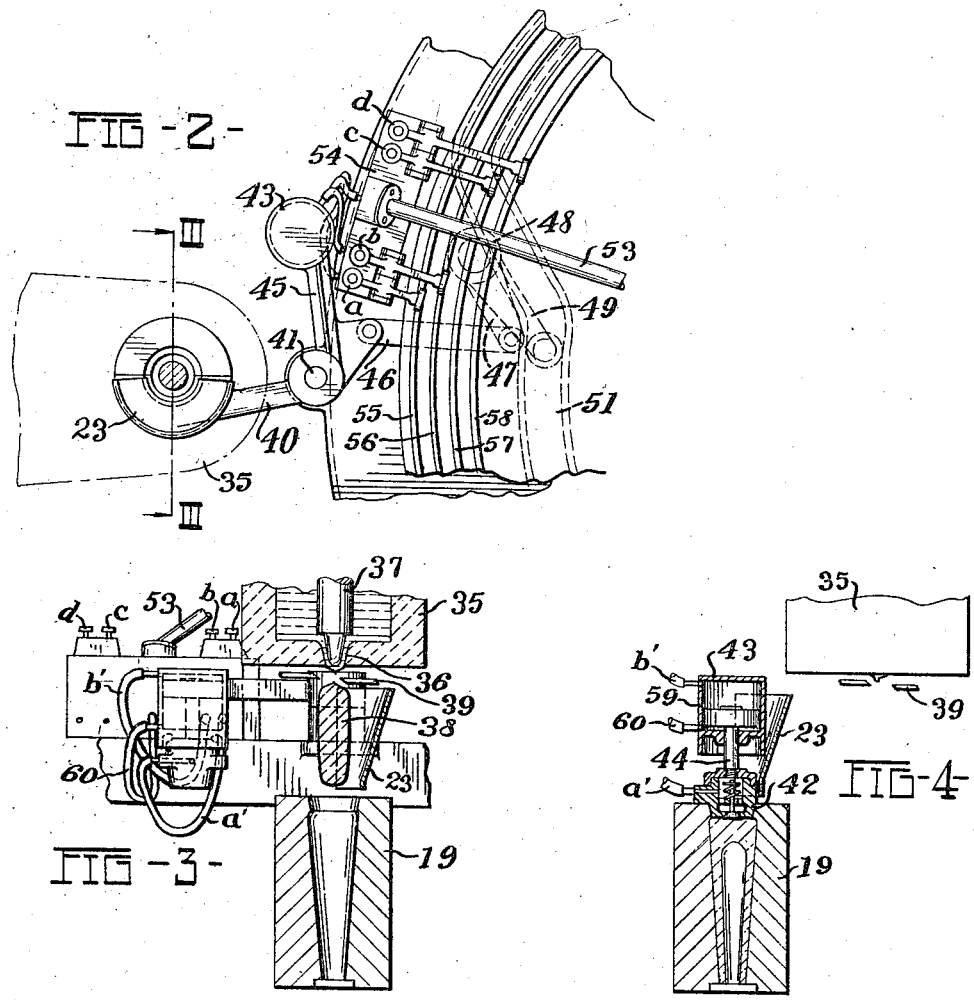

Sept. 20, 1927.
J. F. RULE
1,642,828
GLASS FORMING MACHINE
Filed April 19, 1923
3 Sheets-Sheet 3
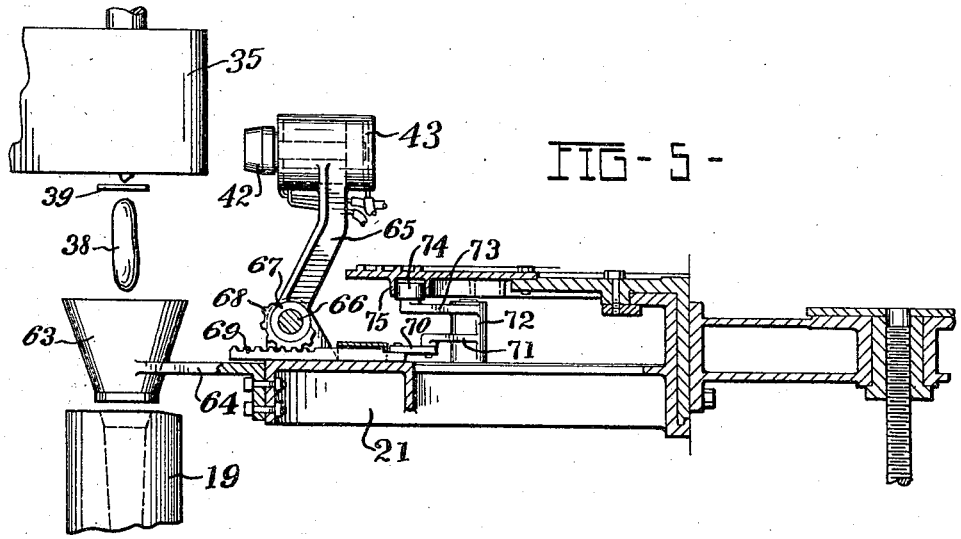
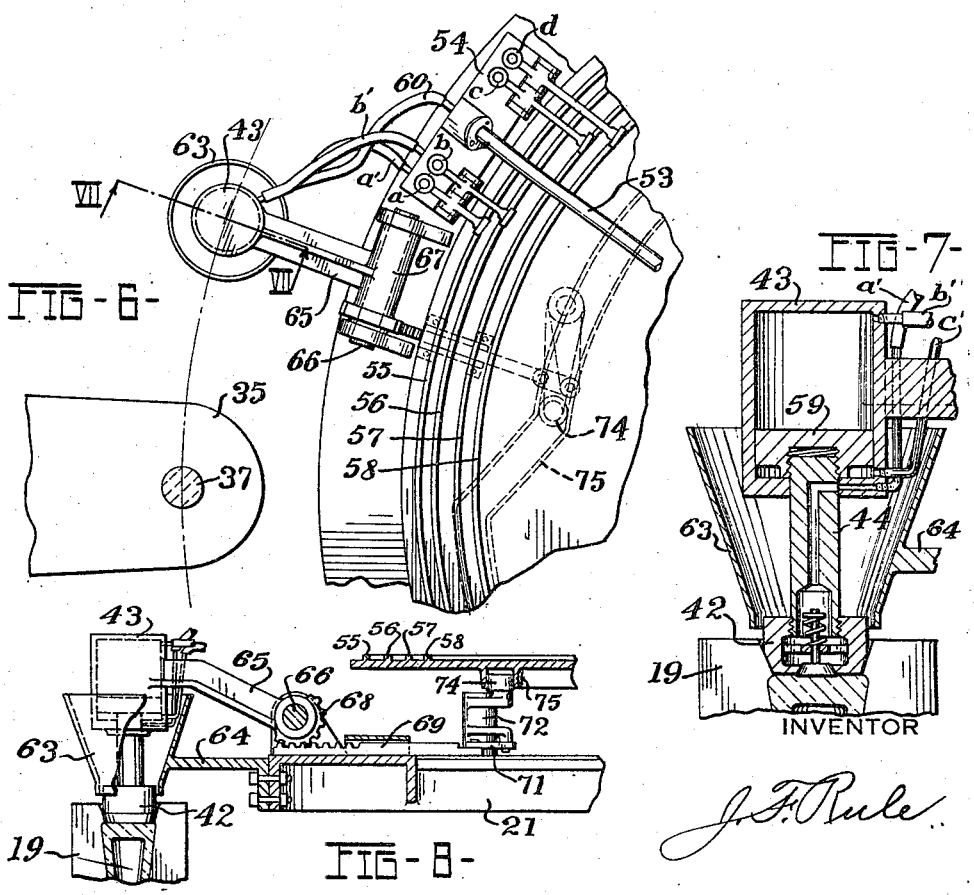
INVENTOR
J. F. Rule Patented Sept. 20, 1927.

1,642,828

UNITED STATES PATENT OFFICE.

JOHN F. RULE, OF TOLEDO, OHIO, ASSIGNOR TO THE OWENS BOTTLE COMPANY, OF TOLEDO, OHIO, A CORPORATION OF OHIO.

GLASS-FORMING MACHINE.

Application filed April 19, 1923. Serial No. 633,067.

My invention relates to glass forming apparatus and particularly to gravity fed glass forming machines. It is customary to feed machines of this type by dropping the charges of glass into the open upper ends of inverted blank molds. When the charges are supplied by automatic feeders, particularly where the mold carriage rotates continuously, means such as funnel shaped guides, are ordinarily provided to guide the charges of glass into the molds as the latter pass the charging station. After a charge is received in the mold, a blow head is brought into position over the receiving end of the mold and air under pressure is supplied through said head for compacting and shaping the glass in the mold. The blow head may also serve as a forming plate or mold bottom when the parison is blown to hollow form by air supplied through the opposite end of the mold.

When individual blow heads mounted on the mold carriage, are provided for the blank molds, as has been found desirable with continuously rotating machines,—it has been the practice to withdraw each funnel guide after a charge has entered the mold, to permit the corresponding blow head to be positioned on the mold.

An object of the present invention is to provide practical means for guiding charges of glass into the molds without interfering with the subsequent positioning and operation of the blow heads and without the necessity of withdrawing the guiding means. To this end, the invention in its preferred form, comprises individual guides, each having a fixed position relative to the mold carriage and to its blank mold while the latter is in charge receiving position. The mold closure, or blow head, is designed to be brought downward past or through the guide into mold closing position without interference between said head and the guide.

In one form of the invention, the guide is in the form of a funnel positioned over the mold, and the blow head is arranged to be projected downward through the funnel to mold closing position after a charge of glass has been dropped through the funnel into the mold.

Another form of invention comprehends the use of a guide which does not completely surround the charge of glass entering the mold, but is located behind, or at one side of, the path of the glass entering the mold. This form of the invention permits the charger to be positioned comparatively close to the path of the molds, so that the charge or gob of glass, when severed, has only a short distance to fall before entering the mold.

Other objects of the invention will appear hereinafter.

In the accompanying drawings:

Figure 1 is a sectional elevation of a glass blowing machine to which my invention is applied, parts being broken away.

Figure 2 is a fragmentary top plan view of a portion of the machine.

Figure 3 is a section at the line III—III on Figure 2.

Figure 4 is a section through a mold, blowing head and guide.

Figure 5 is a part sectional elevation showing a modified form of guide and blow head.

Figure 6 is a top plan view of mechanism shown in Figure 5.

Figure 7 is a section at the line VII—VII on Figure 6, on a larger scale.

Figure 8 is a view similar to Figure 5, but with the blowing head in operative position.

The invention is herein shown as applied to a glass blowing machine such as disclosed in the co-pending application of Richard La France, for glass blowing machines, Serial Number 532,606, filed January 30, 1922. It will be understood, however, that the invention is adapted for use with various other type of machines.

Referring particularly to Figure 1, the machine comprises a central stationary column 15 on which the mold carriage is mounted for continuous rotation. The carriage comprises a lower section or table 16 on which are supported the finishing molds 17, an intermediate section 18 which carries the blank molds 19 and neck mold 20, and an upper section 21 on which the mold closing heads 22 and guides 23 are supported. The carriage is rotated continuously by means of a driving pinion 24 running in mesh with an annular gear 25 on the carriage.

The blank molds 19 are preferably arranged in an annular series on the mold carriage, each mold being in the inverted position shown in Figure 1 when it reaches the charging station, with its upper end open to receive the charge of glass. At this time, the neck mold 20 is directly beneath and in register with the blank mold. After a charge has been dropped into the blank mold, a blowing head is brought into position to close the upper end of the mold, and air is supplied in the manner hereinafter set forth, to compact the glass in the mold.

A head 26 carrying the blank mold and neck mold is then rotated about a horizontal axis to swing the blank mold and neck mold as a unit downward. This movement is effected by means of a pinion 27 driven by a gear segment 28 having an operating connection with a cam roll 29 running on a stationary cam track 30. After the blank mold has been swung downward, it is opened and reinverted, leaving the blank suspended from the neck mold. The finishing mold sections are now closed around the blank, said sections being actuated by a cam 32, after which the blank is blown to its final form. After the bottle has been blown, the finishing mold opens and the mold bottom 33 is tilted to discharge the bottle, said bottom being controlled by a stationary cam 34.

The charges of molten glass are preferably supplied by an automatic feeder which, as herein shown, comprises a furnace boot or forehearth 35 having an outlet opening 36 in the bottom thereof through which the glass issues. The discharge of glass is controlled by a regulator 37 here shown as a vertically reciprocating plunger actuated periodically in timed relation to the movements of the receiving molds 19. As the glass issues from the outlet 36, it forms a suspended gob 38 which is severed automatically by shears 39, permitting the gob to drop into the blank mold 19 which at this time is directly beneath the outlet (see Fig. 3).

As the blank molds 19 are traveling continuously and at a considerable speed, they are only directly beneath the feeder outlet for a very brief interval of time, so that in practice it is found necessary to provide guiding means to insure the charge of glass being properly guided into the mold. For this purpose, I have provided guides individual to the blank molds. As indicated in Figures 1 to 4, each guide 23 is carried by an arm 40 keyed to a shaft 41 having a fixed mounting on the carriage section 21. This guide is in the form of a section of a funnel and comprises an upwardly and outwardly flared or inclined wall or guiding surface which as the blank mold reaches the charging position, is behind the charge of glass and thereby guides the charge into the mold where there is any tendency for the mold to be carried beyond the charging position before the glass has entered the mold. The form and arrangement of guide here shown permits the level of the receiving ends of the molds 19 to be brought up quite close to the outlet of the charger, as shown in Figure 3. This allows the charge to enter the mold very quickly after it is severed and without chilling.

After the glass has been dropped into the blank mold, a blowing head 42 (Fig. 4 and 7) is brought into position to close the upper end of the mold. This head is carried by a piston motor 43, said head being attached to the lower end of the piston rod 44. The motor 43, as shown in Figure 2, is carried on the outer end of an arm 45 mounted to swing horizontally on the shaft 41. The arm 45 is connected through a link 46 to a rock arm 47 on a rocking sleeve 48 on the carriage section 21. A rock arm 49 also fixed to the sleeve 48 carries a roll 50 which runs on a stationary cam 51. This cam is so shaped that after a charge has dropped in the blank mold, the motor 43 with the blow head is swung into a position directly over the mold. Air is then supplied to the motor 43 for lowering the blow head to mold closing position.

This means for controlling the supply of air to this motor will now be described: A constant supply of air under pressure is maintained within a head or drum 52 (Fig. 1) from which extend radial pipes 53 open at their outer ends into air distributing boxes 54 (Figs. 2 and 6). Each box 54 contains valves $a$, $b$, $c$ and $d$ actuated by cams 55, 56, 57, 58 respectively. The valve $a$ when opened supplies air through a pipe $a'$ to the blow head 42. The valve $b$ controls the air supply through a pipe $b'$ to the motor 43 above its piston 59. A pipe 60 leads from the box 54 to the motor 43 at a point below the piston and is open constantly to the air pressure within the box 54. The valve $c$ controls the supply of air for a motor 61 (Fig. 1) which operates a plunger 62 for forming the initial blow opening in the blank. The valve $d$ controls the supply of air for blowing the blank to hollow form.

After the blow head has been brought over the blank mold, as heretofore described, the valve $b$ is opened by its cam 56 and air supplied to the motor 43 through the pipe $b'$ so that the blow head is lowered onto the mold, as shown in Figures 4 and 7. The valve $a$ is then opened by its cam and supplies air through the blow head to compact the glass in the mold. The valve $b$ is then closed, so that air pressure through the pipe 60 lifts the blow head away from the mold. The cam 51 then operates to swing the blow head and its motor to the Figure 2 position, so that the blank mold is free to be swung downward, as heretofore described.

Figures 5 to 8 illustrate a modified construction in which the guide is in the form of a funnel 63 carried by an arm 64 bolted to the carriage section 21. The blow head 42 and its motor 43 are in this instance carried by an arm 65 mounted to swing about a horizontal bearing shaft 66. The hub 67 of the arm 65 carries a pinion 68 running in mesh with a rack 69 connected through a link 70 to a rock arm 71 on a hollow rock shaft 72, to which is also secured an arm 73 carrying a cam roll 74 running on a stationary cam 75. The cam 75 operates through the connections just described to swing the motor 43 downward to the position shown in Figures 7 and 8 after a charge has been dropped into the mold. The operations of lowering the blow head and supplying air therethrough are the same as above described in connection with the form of invention shown in Figures 1 to 4.

Modifications other than those herein disclosed may be resorted to within the spirit and scope of my invention.

What I claim is:

1. The combination with a traveling mold carriage, of a mold thereon open at its upper end to receive a charge of glass, a guide mounted on the carriage in position to guide a vertically descending charge of glass into the mold, said guide projecting upwardly adjacent one side of the charge prior to and during descension of said charge, a closure device mounted on the carriage, and means for moving it into position to close said open end of the mold while the guide is retained in said guiding position.

2. The combination with a traveling mold carriage, of a mold thereon open at its upper end to receive a charge of glass, a guide separate from the mold and mounted on the carriage in position to guide a vertically descending charge of glass into the mold, a mold closing device mounted on the carriage, and means to move it laterally into a position over the mold and downwardly into a mold closing position while said guide retains its said guiding position.

3. The combination with a traveling mold carriage, of a mold thereon open at its upper end to receive a charge of glass, a guide separate from the mold and mounted on the carriage in position to guide a vertically descending charge of glass into the mold, a blow head mounted on the carriage to travel therewith, and means to move it into and out of engagement with the mold at said open end while the guide retains said guiding position, said guide and blow head being relatively arranged and shaped to prevent interference therebetween.

4. The combination of a traveling mold open at its upper end to receive a charge of glass, a guide mounted to travel with the mold and located directly over the mold in position to direct a vertically falling charge of glass into the mold, and a mold closing head mounted to travel with the mold and movable to and from said end of the mold while the guide remains in said position relative to the mold.

5. The combination of a mold carriage, an annular series of molds thereon, means to rotate the mold carriage and bring the molds successively to a charging position, said molds when in said position being open at their upper ends to receive charges of glass dropped therein, guides individual to the molds and each arranged directly over its mold in position for guiding a vertically falling charge of glass into the mold, mold closing heads individual to the molds, and means to move each head laterally and downwardly into mold closing position while the corresponding guide retains its said operative relation to the mold.

6. The combination of a mold carriage, means to rotate it, blank molds thereon open at their upper ends to receive vertically descending charges of glass at a charging station, guides individual to the molds and having a fixed mounting on the mold carriage separate from the molds and directly over their respective molds, means for inverting the molds, and mold closing heads individual to the molds and movable laterally and vertically into and out of position for closing said open ends of the molds while the latter are in said charge receiving position.

7. The combination of a mold carriage, molds thereon, means for rotating the mold carriage and thereby moving the molds successively past a charging station, guides positioned and arranged to direct vertically falling charges of molten glass into the molds as the molds pass said station, said guides having a fixed mounting on the mold carriage directly over their respective molds, and mold closing heads movable downward past the guides into mold closing position.

8. The combination of a continuously rotating mold carriage, a ring of blank molds thereon open at their upper ends to receive charges of glass, guides individual to the molds and having a fixed mounting on the mold carriage directly over their respective molds, said guides being separate from the molds and positioned and arranged to direct vertically falling masses of glass into the molds, blow heads individual to the molds, and means for moving each blow head downward past the guide into position to close said receiving end of its mold independently of the guide while the mold is in its operative position relative to its guide.

9. The combination with a feeder operative to produce suspended charges of molten glass, of a horizontally traveling mold arranged to be brought periodically beneath a suspended charge, and a guide arranged to travel with the mold, the paths of said mold and guide being so positioned relative to the feeder that the guide projects above the lower end of a suspended charge while the mold moves into its charge receiving position said feeder comprising means for severing the suspended charge and permitting it to drop into the mold.

10. The combination with an automatic glass feeder operative to produce suspended charges of molten glass, of an automatic glass forming machine comprising a horizontally rotating carriage, molds thereon open at their upper ends to receive the charges of glass, and guides individual to the molds, said molds arranged to be brought directly beneath the suspended charges of glass, said guides projecting upwardly above the lower ends of the suspended charges while the molds move horizontally into charge receiving position, said feeder including means to sever the charges and permit them to drop into the molds.

11. The combination with an automatic glass feeder operative to produce suspended charges of molten glass, of an automatic glass forming machine comprising a rotating carriage, molds thereon open at their upper ends to receive the charges of glass, guides individual to the molds, said molds arranged to be brought directly beneath the suspended charges of glass, said guides projecting upwardly above the lower ends of the suspended charges, said feeder including means to sever the charges and permit them to drop into the molds, mold closing heads mounted on the mold carriage, and means to move each said head downward past a guide into mold closing position after a charge has entered the mold.

12. In a glass forming machine, the combination of a mold carriage, molds thereon, guides individual to the molds, said guides having a fixed mounting on the mold carriage, means to move the molds into and out of operative relation to the guides, mold closing heads, air motors operative to move the heads up and down out of and into operative relation to the molds, and means to swing said air motors laterally when the said heads have been withdrawn from the molds.

13. In a glass forming machine, the combination of a mold carriage rotatable about a vertical axis, a mold thereon open at its upper end to receive a charge of glass and periodically brought into charge receiving position by the rotation of the mold carriage, a funnel guide mounted on the carriage over and separate from the mold, a blow head, and means to move said blow head downward along a glass guiding surface of the guide into engagement with the mold.

14. In a glass forming machine, the combination of a mold carriage rotatable about a vertical axis, a mold thereon open at its upper end to receive a charge of glass and periodically brought into charge receiving position by the rotation of the mold carriage, means to invert the mold, a funnel guide separate from the mold and having a fixed mounting on the carriage, a mold closing head mounted on the carriage and rotating therewith, and means to move said head downward along a glass guiding surface of the guide into engagement with the mold.

15. The combination with means for producing suspended charges of glass, of a mold carriage, molds thereon, guides for directing the charges of glass into the molds, said guides being mounted on the mold carriage and arranged to be brought successively to a position at one side of and in close proximity to a charge while the latter is suspended and means to sever the charge when its guide is in such position.

16. The combination of a mold carriage, an annular series of molds thereon, means to rotate the mold carriage and bring the molds successively to a charging position, said molds when in said position being open at their upper ends to receive charges of glass dropped therein, guides individual to and separate from the molds and each arranged directly over its mold in operative relation thereto, the guide being positioned at one side of a vertically moving charge of glass prior to and during its movement, to guide said charge into the mold, and mold closing heads individual to the molds and movable into position to close said open ends of the molds.

17. The combination of a mold carriage, an annular series of molds thereon, means to rotate the mold carriage and bring the molds successively to a charging position, said molds when in said position being open at their upper ends to receive charges of glass dropped therein, guides individual to the molds and each arranged directly over its mold in position for guiding a vertically falling charge of glass into the mold, said guide projecting upwardly at one side of the charges prior to and during their downward movement, mold closing heads individual to the molds, and means to move each head into mold closing position while the corresponding guide retains its operative relation to the mold.

Signed at Toledo, in the county of Lucas and State of Ohio, this 16th day of April, 1923.

JOHN F. RULE.